(12) United States Patent
Barthomeuf et al.

(10) Patent No.: US 7,555,402 B2
(45) Date of Patent: Jun. 30, 2009

(54) METHOD FOR DETERMINING THE ANGULAR POSITION OF THE STEERING WHEEL OF AN AUTOMOBILE VEHICLE ELECTRIC POWER-ASSISTED STEERING SYSTEM

(75) Inventors: Julien Barthomeuf, Saint Genis Laval (FR); Stephane Cassar, Lyons (FR); Andre Michelis, Irigny (FR)

(73) Assignee: JTEKT Europe, Irigny (FR)

( * ) Notice: Subject to any disclaimer, the term of this patent is extended or adjusted under 35 U.S.C. 154(b) by 150 days.

(21) Appl. No.: 11/666,207

(22) PCT Filed: Sep. 16, 2005

(86) PCT No.: PCT/FR2005/002297

§ 371 (c)(1),
(2), (4) Date: Jun. 18, 2007

(87) PCT Pub. No.: WO2006/045911

PCT Pub. Date: May 4, 2006

(65) Prior Publication Data

US 2008/0140340 A1   Jun. 12, 2008

(30) Foreign Application Priority Data

Oct. 25, 2004   (FR) .................................. 04 11355

(51) Int. Cl.
*G01C 9/00* (2006.01)

(52) U.S. Cl. .................... 702/151; 702/145; 702/146; 702/147; 702/148; 702/149; 702/150; 324/174; 324/207.22; 324/207.2; 701/41; 701/42; 701/43; 180/402; 180/403; 180/408; 180/421; 180/443; 180/445; 180/446

(58) Field of Classification Search ......... 702/145–151; 324/174, 207.2, 207.22; 701/41–43; 180/402, 180/403, 408, 421–422, 443, 445, 446
See application file for complete search history.

(56) References Cited

U.S. PATENT DOCUMENTS

| 6,400,143 B1 * | 6/2002 | Travostino et al. ..... 324/207.22 |
| 2003/0057903 A1 * | 3/2003 | Desbiolles et al. .......... 318/254 |

FOREIGN PATENT DOCUMENTS

| EP | 1 026 068 A1 | 8/2000 |
| EP | 1 362 766 A2 | 11/2003 |
| FR | 2 769 088 A1 | 4/1999 |
| FR | 2 790 094 A1 | 8/2000 |
| FR | 2 830 140 A1 | 3/2003 |
| FR | 2 848 974 A1 | 6/2004 |

* cited by examiner

*Primary Examiner*—Tung S Lau
*Assistant Examiner*—Sujoy K Kundu
(74) *Attorney, Agent, or Firm*—Oliff & Berridge, PLC

(57) ABSTRACT

The method consists in: determining in which actually sector the booster motor is located, a sector of the booster motor being defied by two successive poles; determining a relative angle position of the steering wheel in relation to the booster motor; identifying a sector, known as neutral, in which the booster motor is located when the rotation speeds of the rear wheels, i.e. right and left of the vehicle, are equal; determining an angle offset of the steering wheel corresponding to a neutral angle position of the steering wheel; determining an absolute angle position of the steering wheel which is equal to the difference between the relative angle position of the steering wheel and the offset angle thereof.

6 Claims, 2 Drawing Sheets

METHOD FOR DETERMINING THE ANGULAR POSITION OF THE STEERING WHEEL OF AN AUTOMOBILE VEHICLE ELECTRIC POWER-ASSISTED STEERING SYSTEM

The present invention relates, in general, to motor vehicles equipped with electric power-assisted steering. More particularly, this invention relates to a method for determining the angular position of the steering wheel of an automobile vehicle electric power-assisted steering system.

In a generally known manner, a vehicle with electric power-assisted steering comprises an assistance electric motor, with two rotation directions, whose exit shaft is usually coupled, via a speed-reducer gear for example a worm screw and gear wheel, to the steering column of the vehicle, so as to transmit a motor torque (which could also be a resisting torque) to this steering column. The assistance torque is itself communicated, via the mechanical part of the steering system, generally of the rack and pinion type, to the two drive wheels of the vehicle in question, so as to orient them with a view to turning right or left, or to a straightening up. Electric power-assisted steering systems are also known with power-assistance systems acting on the rack rail; in such systems, the assistance electric motor is coupled, for example, to a reducer of the ball/screw type which transmits the assistance effort directly to the rack rail.

The assistance electric motor is controlled by an on-board electronic processor, which receives various input signals and which processes them, in such a manner as to control, at every moment, the assistance electric motor in an optimized manner. The input quantities thus used in the processor for the electric power assisted steering regulation are, in particular, the instantaneous angular position of the steering wheel of the vehicle, and/or of the assistance electric motor, the torque exerted by the driver on the steering wheel, and the instantaneous speed of the vehicle. The processor may also use other parameters, deduced by a calculation, for example the speed of rotation of the steering wheel obtained as a derivative, with respect to time, of the angle of the steering wheel.

More particularly, the measurement of the instantaneous angular position of the steering wheel is usually carried out by a steering wheel angular position sensor which remains complex to implement and to calibrate, this sensor generally being disposed on the steering column. The information supplied by such a sensor is processed by the on-board processor, for the steering wheel automatic return function, for the assistance regulation algorithms, and also in order to be transmitted to the PES (programmed electronic stability device) equipment responsible for the general stability of the vehicle. The latter determines, as a function of the longitudinal and transverse accelerations of the vehicle and of the position of the steering wheel, whether a risk of skidding exists and whether independent wheel braking is necessary or not.

The information supplied by this position sensor must be very precise and must be available as soon as the electronics of the electric power-assisted steering are reset when the vehicle is started. In addition, the steering wheel must be able to be turned through a large angle when the ignition is switched off.

In order to meet these requirements, in particular, a position sensor with an 'absolute zero' is used, which leads to a significant extra cost of the steering system.

The present invention aims, principally, to eliminate such a complex steering wheel angular position sensor, while still having information representative of the angular position of the steering wheel available, in such a manner as to greatly simplify the construction of the steering column for an electric power-assisted steering system.

For this purpose, the subject of the invention is a method for determining the angular position of the steering wheel of an automobile vehicle electric power-assisted steering system, the steering system comprising an assistance electric motor controlled by an on-board electronic processor, the assistance electric motor comprising a plurality (n) of stator poles distributed around its circumference, a measurement of the instantaneous angular position between two successive poles of the assistance electric motor being carried out by a sensor, notably of the resolver type or using the Hall effect, the method consisting in determining in which current sector (tr_motor), a sector of the assistance motor being bounded by two successive poles, the assistance motor is situated, the passage from one sector to another, preceding or following respectively, being identified when the separation between two measurements from the sensor of the instantaneous angular position of the assistance motor is, respectively, less than a first predetermined value or greater than a second predetermined value;

determining a relative angular position (Angle_steer_rel) of the steering wheel, with respect to the assistance motor, as a function of a reduction ratio between the assistance motor and the steering column, and of a reference instantaneous angular position ($\theta_0$) of the assistance motor within one sector, in particular by the formula:

$$\text{Angle\_steer\_rel} = \frac{1}{\text{reduction\_ratio}} \times \left( \frac{\text{tr\_motor}}{n} \times 360 + (\theta - \theta_0) \right)$$

identifying a sector (tr_motor_neutral), referred to as neutral sector, in which the assistance motor is situated when the rotation speeds of the right-hand rear wheel and left-hand rear wheel of the vehicle are equal;

determining an angular offset (Angle_Offset) of the steering wheel, corresponding to a neutral angular position of the steering wheel, as a function of the current sector, of the neutral sector, and of the reduction ratio between the assistance motor and the steering column, in particular by the formula:

$$\text{Angle\_Offset} = \frac{360}{n} \times \left( \frac{\text{tr\_motor} \cdot \text{tr\_motor\_neutral}}{\text{reduction\_ratio}} \right);$$

determining an absolute angular position of the steering wheel, which is equal to the difference between the relative angular position of the steering wheel and its angular offset.

Thus, the inventive step consists in carrying out at each moment a sufficiently precise and exploitable estimation of the angular position of the steering wheel, by no longer determining the value of this angular position by a dedicated sensor, such as that currently placed on the steering column, but by an estimation made using other information relating to the position of the rotor of the assistance electric motor and supplied by a sensor associated with the assistance electric motor. This information is reliable and precise, which allows the variation of the angular position of the steering wheel over time to be known exactly and from the moment of reset.

An estimation, referred to as mechanical estimation (tr_motor_neutral_wheels), of the neutral sector, proportional to the difference between a turning angle at the steering wheel and the relative angular position of the steering wheel, is advantageously carried out, in particular by the formula:

$$tr \cdot \text{motor\_neutral\_wheels} = \frac{\alpha \text{wheels} - \text{angle\_steer\_rel}}{(360/n)}$$

the turning angle ($\alpha$ wheels) at the steering wheel being determined by calculation as a function of the speed of the vehicle (v), of the wheel-base of the vehicle (L), of the understeer gradient (K), of the demultiplication (D) of the steering system, and of the turning radius (R), in particular by the formula:

$$\alpha \text{wheels} = D\left(\frac{L}{R} + K\frac{v^2}{R}\right).$$

The turning radius (R) is for example determined by calculation as a function of the rotation speeds of the right hand rear wheel (v rear R) and left hand rear wheel (v rear L) of the vehicle, in particular by the formula:

$$R = \frac{\text{Base\_Rear}}{2} \times \frac{vrearR + vrearL}{|vrearR - vrearL|}$$

where Base_Rear denotes a predetermined constant.

A statistical estimation of the neutral sector is advantageously carried out by determining, whenever the rotation speeds of the right-hand rear wheel and left-hand rear wheel of the vehicle are equal, the number of occurrences of the assistance motor within each sector, the neutral sector being the sector with the greatest number of occurrences of the assistance motor.

The statistical estimation of the neutral sector can be validated if the number of occurrences of the assistance motor within this sector is greater than at least one predetermined threshold.

Advantageously, for the sake of reliability of the method, the identification of the neutral sector is validated when the statistical estimation and mechanical estimation return the same value.

The invention will, in any event, be better understood with the aid of the description that follows, with reference to the appended schematic drawing illustrating, by way of example, one embodiment of this method:

Figure 1:
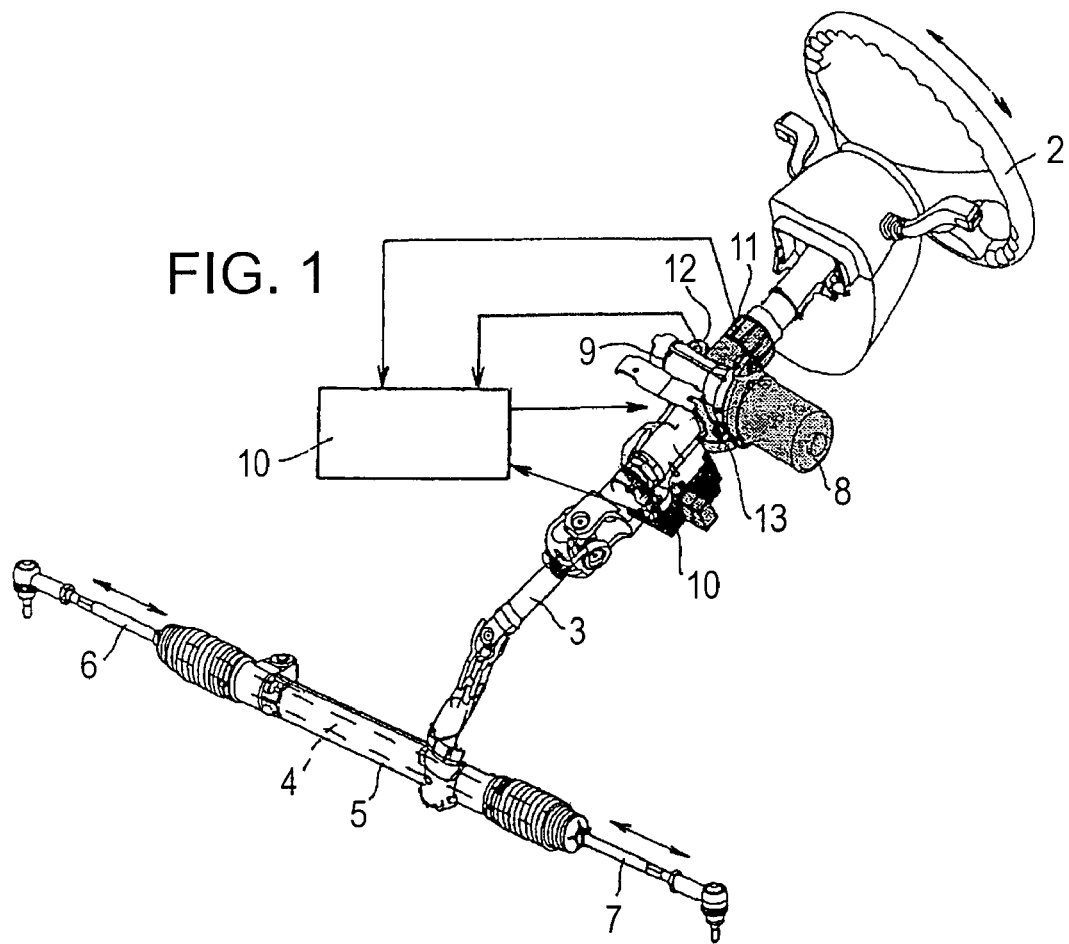
FIG. 1 shows a schematic perspective view of an electric power-assisted steering system from the prior art.

FIG. 1 recalls what are the main elements composing an electric power-assisted steering system.

Such a steering system comprises, on the one hand, a mechanical part globally denoted by the reference 1, comprising a steering wheel 2 linked to a steering column 3, whose far end from the steering wheel 2 carries a steering pinion set against a rack rail 4, mounted to allow sliding within a gear housing 5. The two opposing ends of the rack rail 4 are respectively linked, via connecting rods 6 and 7, to the right and left drive wheels (not shown) of the automobile vehicle in question.

In order to assist the manual effort exerted by the driver of the vehicle on the steering wheel 2, the steering system comprises an assistance electric motor 8, with two directions of rotation, whose exit shaft is coupled, via a speed-reducer gear 9 notably with worm screw and gear wheel, to the steering column 3, so as to transmit a motor torque (which could also be a resisting torque) to this steering column 3.

The assistance electric motor 8 is controlled by an on-board electronic processor 10, which receives and processes various signals coming from sensors. In a conventional embodiment, the electronic processor 10 receives an electric signal coming from a sensor 11 of the angle of the steering wheel 2, representative of the instantaneous turning angle of the automobile vehicle in question, and this processor 10 also receives a signal coming from a torque sensor 12 placed on the steering column 3, thus measuring the torque exerted by the driver on the steering wheel 2.

In the example illustrated, a resolver 13 is further provided in order to detect the absolute angular position $\theta$ of the assistance electric motor 8 between two successive poles from amongst the n stator poles of the assistance motor 8, with $$0 < \theta < \frac{360}{n}.$$

Using these various pieces of information, and possibly also using parameters external to the steering system, such as the speed of the vehicle, the electronic processor 10 controls the assistance electric motor 8 by defining, at each moment, an assistance torque or effort that can amplify or, on the contrary, compensate for the effort applied by the driver to the steering wheel 2, according to predefined "assistance laws".

Figure 2:
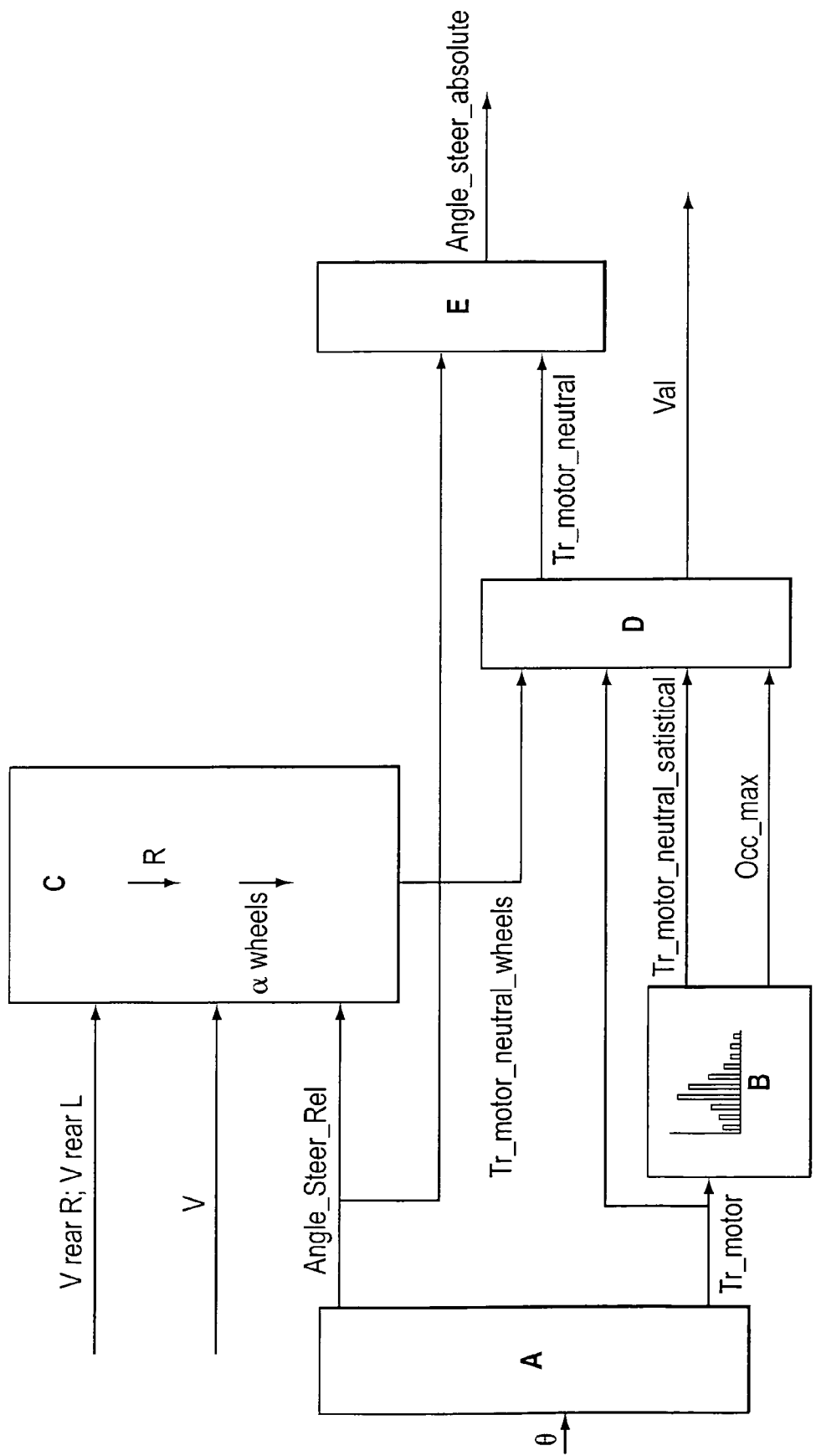
FIG. 2 is a block diagram illustrating the steps of the method of the invention.

With respect to the prior art illustrated in FIG. 1, the present invention allows the sensor 11 of the angle of the steering wheel 2 to be eliminated, by replacing it with an estimation carried out in the on-board electronic processor 10, according to the algorithm shown in FIG. 2.

This algorithm may be broken down into five blocks A, B, C, D and E.

Since the transverse cross-sectional plane of the assistance motor 8 is subdivided into n sectors each bounded by two successive stator poles, a block A determines in which of these n sectors the assistance motor 8 is situated, by respectively decrementing or incrementing by one unit a variable tr_motor, corresponding to the current sector, when the separation between two measurement samples of the resolver 13 is, respectively, less than a first predetermined value or greater than a second predetermined value.

Starting from a reduction ratio reduction_ratio between the assistance motor 8 and the steering column 3, and from a predetermined constant $\theta_0$ denoting an instantaneous reference position of the assistance motor 8 between two successive poles, the block A also determines a relative angular position Angle_steer_rel of the steering wheel 2, with respect to the angular position of the assistance motor 8, by the formula $$\text{Angle\_steer\_rel} = \frac{1}{\text{reduction\_ratio}} \times \left(\frac{\text{tr\_motor}}{n} \times 360 + (\theta - \theta_0)\right).$$

A block B carries out an estimation of the number of occurrences of the assistance motor 8 within each of the sectors, whenever the rotation speeds of the right-hand rear wheel and left-hand rear wheel of the vehicle are equal, the sector having the greatest number of occurrences being identified as statistical neutral sector tr_motor_neutral_statistical.

If the same sector is observed during one given period of observation, the number of occurrences of this sector is incremented by one unit.

The numbers of occurrences of the ten most observed sectors are stored in a table, whose updating rules are as follows.

If a sector observed is already in the table, then its number of occurrences is incremented by one unit. If a sector observed is not in the table, but its number of occurrences is greater than that of the last sector in the table, whose number of occurrences is the lowest in the table, then said last sector is erased from the table and replaced by the sector observed.

The statistical neutral sector tr_motor_neutral_statistical corresponds to the sector having the highest number of occurrences Occ_max in the table.

In parallel with this statistical estimation, a calculation of a turning angle α wheels at the steering wheel is carried out, by means of a mechanical model, by the formula $$\alpha \text{wheels} = D\left(\frac{L}{R} + K\frac{v^2}{R}\right)$$

where D denotes the demultiplication, L the wheel-base of the vehicle, v the speed of the vehicle, L the under-steer gradient and R the turning radius.

The turning radius R is determined by the formula:

$$R = \frac{\text{Base\_Rear}}{2} \times \frac{v\text{rearR} + v\text{rearL}}{|v\text{rearR} - v\text{rearL}|}$$

where Base_Rear denotes a predetermined constant, v rear R the speed of the right-hand rear wheel, and v rear L the speed of the left-hand rear wheel.

Starting from the turning angle α wheels thus calculated and from the relative angular position Angle_steer_rel of the steering wheel 2 previously calculated, a block C performs an estimation, referred to as 'mechanical estimation', of the neutral sector tr.motor_neutral_wheels by the formula:

$$\text{tr\_motor\_neutral\_wheels} = \frac{\alpha \text{wheels} - \text{angle\_steer\_rel}}{(360/n)}$$

A decision table D compares the previous statistical and mechanical estimations of the neutral sector.

If tr_motor_neutral_statistical=tr_motor_neutral_wheels, then the corresponding sector is identified as being the neutral sector, which is denoted as tr_motor_neutral.

The decision table D then returns a validity parameter Val on the determination of the neutral sector. This validity parameter Val can take three values, 0, 1 or 2, according to whether the number of occurrences Occ_max associated with the neutral sector tr_motor_neutral_statistical is less than or greater than a first or a second predetermined and parameterizable threshold.

When the validity parameter Val for example takes
the value 0, the method cannot calculate an absolute angular position of the steering wheel;
the value 1, the absolute angular position of the steering wheel will only be calculated by the method with a precision of ±20°;
the value 2, the absolute angular position of the steering wheel will be calculated by the method with a precision of ±4°, Finally, a block E calculates an angular offset Angle_offset of the steering wheel 2 corresponding to a neutral angular position of the steering wheel 2, from the neutral sector tr_motor_neutral previously validated by the decision table D, by the following formula:

$$\text{Angle\_Offset} = \frac{360}{n} \times \left(\frac{\text{tr\_motor} - \text{tr\_motor\_neutral}}{\text{reduction\_ratio}}\right).$$

An absolute angular position Angle_steer_absolute of the steering wheel 2 is then calculated by the block E, by the following formula:

Angle_steer_absolute=Angle_steer_rel−Angle_Offset.

Since the absolute angular position Angle_steer_absolute of the steering wheel 2 may be used by active functions controlling the power-assistance of the steering wheel, surveillance functions are advantageously provided in order that the variable Angle_steer_absolute and, where appropriate, the validity parameter Val be reset to zero in the case of a logical error condition (division by zero, memory overflow, etc. . . . ) within the intermediate calculation functions, or in the case of a physical fault with the signal from the resolver 13.

In addition, in the case of loss of data, especially relating to the speeds of the rear wheels, supplied by a multiplexer network CAN of the vehicle, the decision table D terminates its calculation.

If the validity parameter Val is equal to 1 or 2, then the decision table D remains in its current state, the stored neutral sector tr_motor_neutral is conserved for as long as the fault is present.

The management of the angular position of the steering wheel by means of the resolver 13 or of a Hall effect sensor of the position of the motor 8 allows a high precision to be obtained in the determination of the angular position of the steering wheel, which improves the electric power-assistance and EPS equipment algorithms.

It goes without saying that the invention is not limited to the single embodiment that has been described hereinabove, by way of example; on the contrary, it embraces all of the variant embodiments and applications of it that adhere to the same principle. Thus, it is notably in this manner that the system would not stray from the scope of the invention with the adoption of another type of sensor of the instantaneous angular position of the assistance motor between two successive poles, such as a Hall effect sensor, or whatever the details of the algorithm implemented, the particularities of the electric power-assisted steering concerned, etc.

The invention claimed is:

1. A method for determining the angular position of the steering wheel (2) of an automobile vehicle electric power-assisted steering system, the steering system comprising an assistance electric motor (8) controlled by an on-board electronic processor (10), the assistance electric motor (8) comprising a plurality (n) of stator poles distributed around its circumference, a measurement of the instantaneous angular position (θ) between two successive poles of the assistance electric motor (8) being carried out by a sensor, notably of the resolver type (13) or using the Hall effect, characterized in that it consists in determining in which current sector (tr_motor), a sector of the assistance motor (8) being bounded by two successive poles, the assistance motor (8) is situated, the passage from one sector to another, preceding or following respectively, being identified when the separation between two measurements from the sensor (13) of the instantaneous angular position (θ) of the assistance motor (8) is, respectively, less than a first predetermined value or greater than a second predetermined value;

determining a relative angular position (Angle_steer_rel) of the steering wheel (2), with respect to the assistance motor (8), as a function of a reduction ratio (reduction_ratio) between the assistance motor (8) and the steering column (3), and of a reference instantaneous angular position ($\theta_0$) of the assistance motor (8) within one sector, in particular by the formula:

$$\text{Angle\_steer\_rel} = \frac{1}{\text{reduction\_ratio}} \times \left(\frac{\text{tr\_motor}}{n} \times 360 + (\theta - \theta_0)\right)$$

identifying a sector, referred to as neutral sector (tr_motor_neutral), in which the assistance motor (8) is situated when the rotation speeds of the right-hand rear wheel (v rear R) and left-hand rear wheel (v rear L) of the vehicle are equal;

determining an angular offset (Angle_offset) of the steering wheel (2), corresponding to a neutral angular position of the steering wheel, as a function of the current sector (tr_motor), of the neutral sector (tr_motor_neutral), and of the reduction ratio (reduction_ratio) between the assistance motor (8) and the steering column (3), in particular by the formula:

$$\text{Angle\_Offset} = \frac{360}{n} \times \left(\frac{\text{tr\_motor} - \text{tr\_motor\_neutral}}{\text{reduction\_ratio}}\right);$$

determining an absolute angular position (Angle_steer_absolute) of the steering wheel (2), which is equal to the difference between the relative angular position (Angle_steer_rel) of the steering wheel (2) and its angular offset (Angle_offset).

2. The method as claimed in claim 1, wherein in that an estimation, referred to as mechanical estimation (Lr_motor_neutral_wheels), of the neutral sector, proportional to the difference between a turning angle (α wheels) at the steering wheel (2) and the relative angular position (Angle_steer_rel) of the steering wheel (2), is carried out, in particular by the formula:

$$\text{tr\_motor\_neutral\_wheels} = \frac{\alpha \text{wheels} - \text{angle\_steer\_rel}}{(360/n)}$$

the turning angle (α wheels) at the steering wheel (2) being determined by calculation as a function of the speed of the vehicle (v), of the wheel-base of the vehicle (L), of the understeer gradient (K), of the demultiplication (D) of the steering system, and of the turning radius (R), in particular by the formula:

$$\alpha \text{wheels} = D\left(\frac{L}{R} + K\frac{v^2}{R}\right).$$

3. The method as claimed in claim 2, wherein in that the turning radius (R) is determined by calculation as a function of the rotation speeds of the right-hand rear wheel (v rear R) and left-hand rear wheel (v rear L) of the vehicle, in particular by the formula:

$$R = \frac{\text{Base\_Rear}}{2} \times \frac{v\text{rearR} + v\text{rearL}}{|v\text{rearR} - v\text{rearL}|}$$

where Base_Rear denotes a predetermined constant.

4. The method as claimed in claim 1, wherein in that a statistical estimation (tr_motor_neutral_statistical) of the neutral sector is carried out by determining, whenever the rotation speeds of the right-hand rear wheel (v rear R) and left-hand rear wheel (v rear L) of the vehicle are equal, the number of occurrences of the assistance motor (8) within each sector, the neutral sector (tr_motor_neutral_statistical) being the sector with the greatest number of occurrences (Occ_max) of the assistance motor (8).

5. The method as claimed in claim 4, wherein the statistical estimation of the neutral sector (tr_motor_neutral_statistical) is validated if the number of occurrences (Occ_max) of the assistance motor (8) within this sector is greater than at least one predetermined threshold.

6. The method as claimed in claim 2, wherein a statistical estimation (tr_motor_neutral_statistical) of the neutral sector is carried out by determining, whenever the rotation speeds of the right-hand rear wheel (v rear R) and left-hand rear wheel (v rear L) of the vehicle are equal, the number of occurrences of the assistance motor (8) within each sector, the neutral sector (tr_motor_neutral_statistical) being the sector with the greatest number of occurrences (Occ_max) of the assistance motor (8), and wherein the identification of the neutral sector is validated when the statistical estimation (tr_motor_neutral_statistical) and mechanical estimation (tr_motor_neutral_wheels) return the same value (tr_motor_neutral).

\* \* \* \* \*